Dec. 8, 1953 L. REICHOLD 2,661,552
STEAMING AND PRESSING APPARATUS
Filed July 11, 1951 3 Sheets-Sheet 1
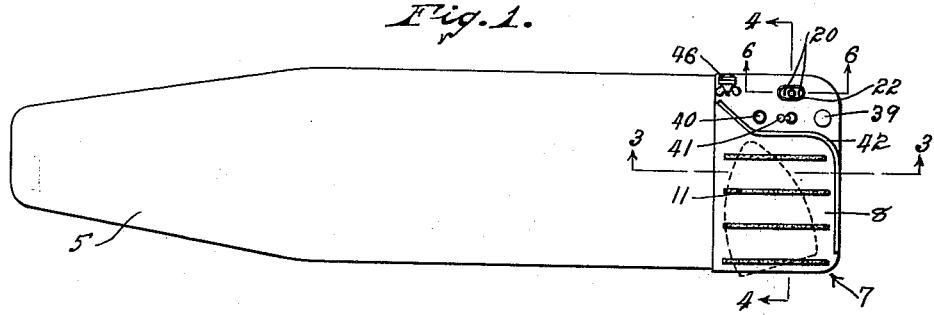
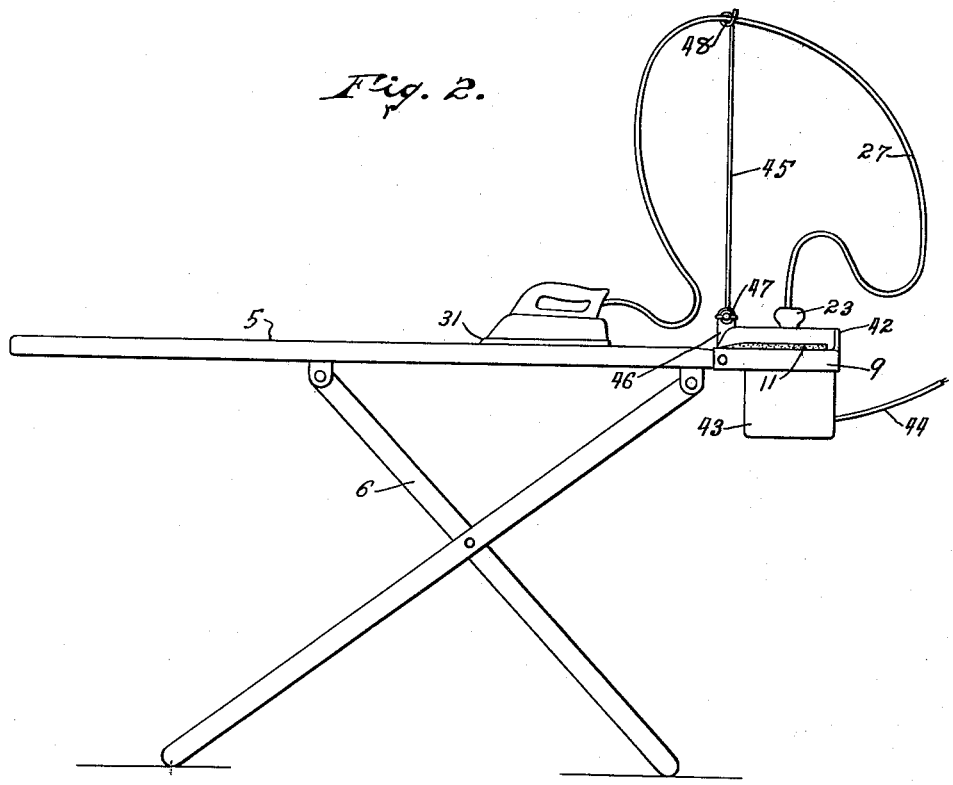
INVENTOR.
LUDWIG REICHOLD
BY
*Louis V. Lucia*
ATTORNEY

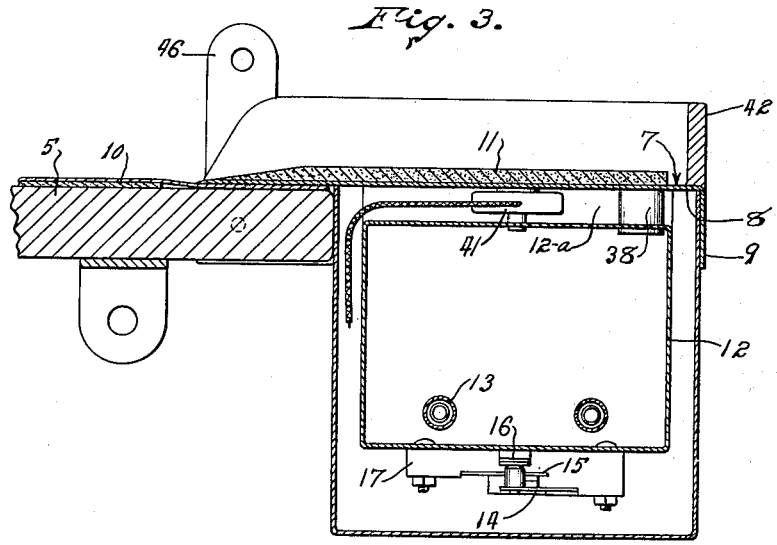
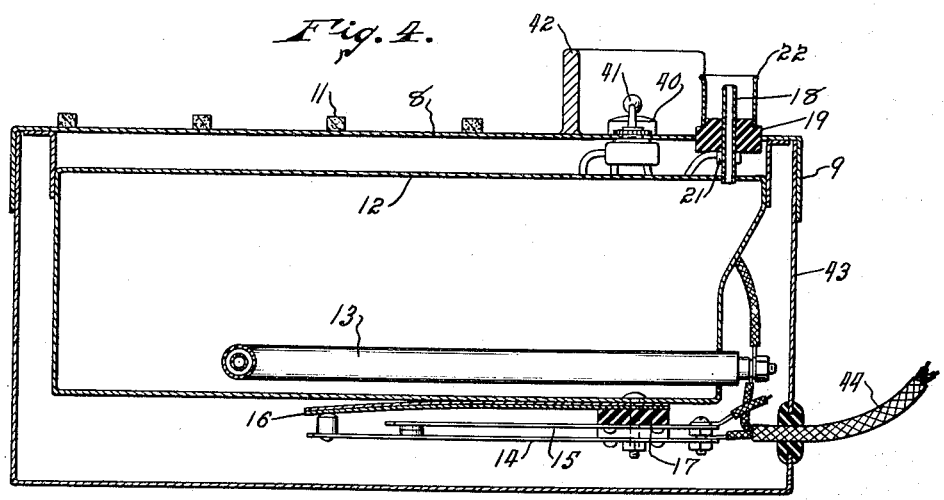
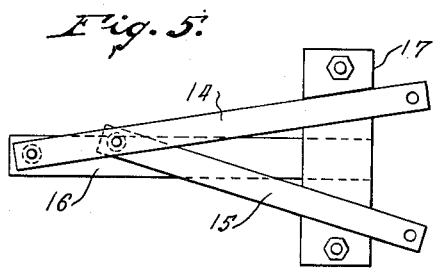
INVENTOR.
LUDWIG REICHOLD
BY
*Louis V. Lucia*
ATTORNEY.

Dec. 8, 1953            L. REICHOLD            2,661,552
STEAMING AND PRESSING APPARATUS
Filed July 11, 1951            3 Sheets-Sheet 3
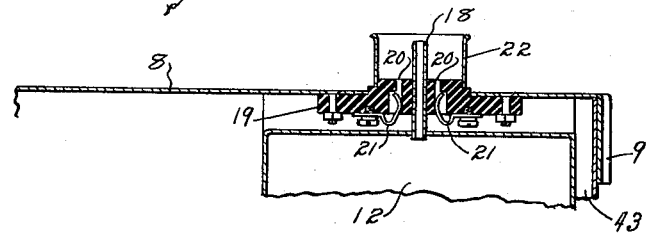
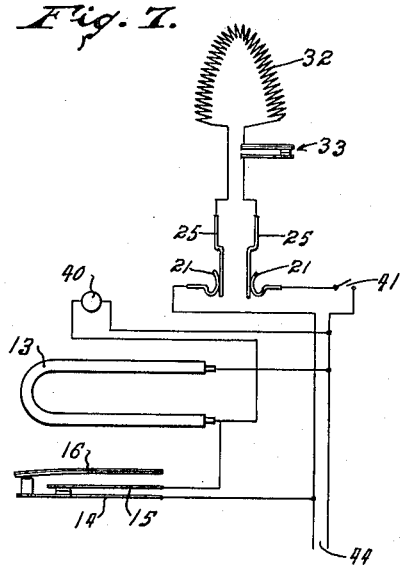
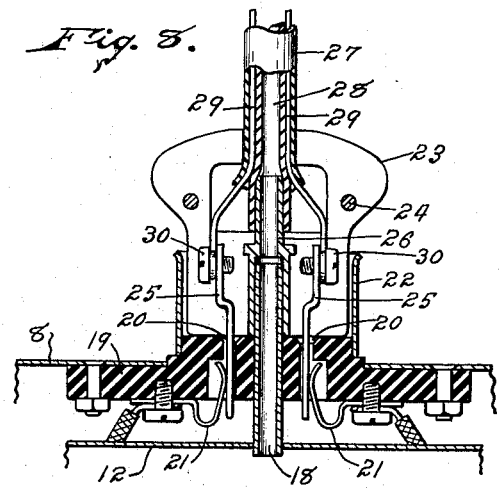
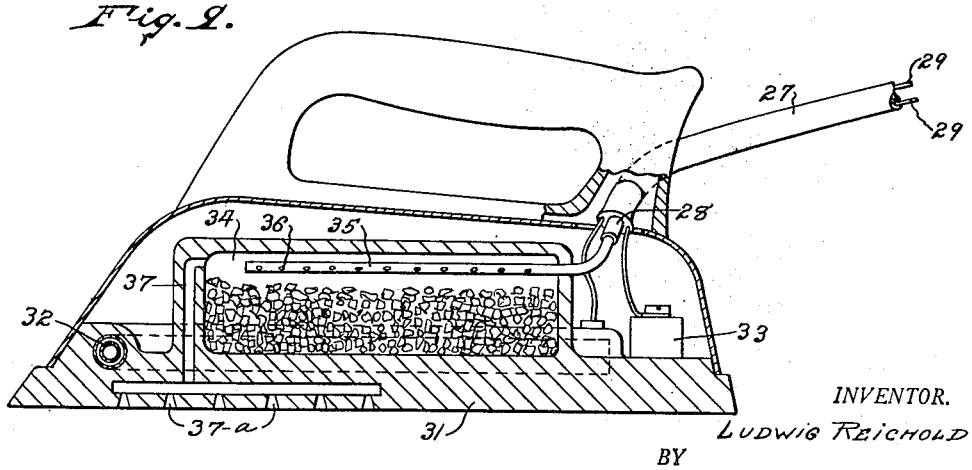
INVENTOR.
LUDWIG REICHOLD
BY
Louis V. Lucia
ATTORNEY Patented Dec. 8, 1953

2,661,552

UNITED STATES PATENT OFFICE 2,661,552

STEAMING AND PRESSING APPARATUS

Ludwig Reichold, Simsbury, Conn.

Application July 11, 1951, Serial No. 236,111

9 Claims. (Cl. 38—77)

1

This invention relates to steaming and pressing apparatus and more particularly to apparatus for supplying steam through a pressing iron to aid in pressing operations.

An object of this invention is to provide a steaming and pressing apparatus which includes an improved steam generating device that may be secured directly to an ironing board in such a manner as to facilitate the ironing operation by providing sufficient steam for long periods of ironing.

A further object of this invention is to provide such a device which is highly efficient in the generation of steam, convenient to use and economical to produce and operate.

A still further object of this invention is the provision of such a steam generating device having suitable means for supporting a pressing iron between pressing operations.

A still further object of the invention is the provision of a novel combined steam and electric conductor for connecting a pressing iron to the said steam generator and to a supply of electric current.

A still further object of the invention is the provision of a novel pressing iron which is especially adapted for use in combination with said steam generator.

Further objects and advantages of this invention will be more clearly understood from the following description and from the accompanying drawings in which:

Fig. 1 is a plan view of my improved apparatus showing the steam generating device mounted upon an ironing board of conventional form.

Fig. 2 is a side view thereof showing a pressing iron connected to said steam generating device.

Fig. 3 is an enlarged sectional side view on line 3—3 of Fig. 1.

Fig. 4 is a sectional end view on line 4—4 of Fig. 1.

Fig. 5 is a bottom view of the electric control switch embodied in the said device.

Fig. 6 is an enlarged sectional end view on line 6—6 of Fig. 1, showing the steam and electric connector forming a part of the invention.

Fig. 7 is a diagrammatic view illustrating the electric circuit included in my improved apparatus.

Fig. 8 is a further enlarged sectional side view of a connector plug embodied in this invention, the said plug being shown attached to the connector receptacle illustrated in Fig. 6.

Fig. 9 is a sectional side view of a steaming and pressing iron which is used in connection with the present invention.

2

In the embodiment illustrated in the drawings, the numeral 5 denotes an ironing board of conventional type which is mounted upon suitable legs 6.

My improved steaming and pressing apparatus includes a steam generating device 7 comprising a top plate 8 having a depending skirt 9 along the side and rear edges thereof, by means of which the said steam generating device may be secured to the end of the ironing board as clearly shown in Fig. 3. This top plate may rest upon the conventional ironing cover 10 and is preferably provided, upon the top surface thereof, with a series of spaced supporting strips 11 for supporting a pressing iron while hot.

To the bottom of said top plate there is mounted a liquid container 12 which is supported by hangers 12-a depending from the said bottom.

An electrical heating unit 13, preferably of the immersion type, is provided within the container 12 adjacent the bottom thereof and the said unit is electrically connected so as to be controlled by an electric switch which includes contact blades 14 and 15 and is operated by a thermally responsive bi-metallic bar 16 to control the operation of the switch for preventing excessive heating of the container 12 particularly when all of the liquid has evaporated therefrom. The said switch blades 14 and 15 are mounted upon an insulating block 17 which is secured to the bottom of the container 12 and clamps the bi-metallic member 16 into contact with said bottom so as to render it closely responsive to the temperature thereof.

The said container 12 has a steam outlet tube 18 which extends from the top of the container through an insulating base 19 of a steam and electric connector receptacle that is secured to the underside of the top plate 8 and has a pair of openings 20 adapted to receive the prongs of an electric plug. A resilient contact 21 is located in each of said openings and is adapted to engage one of the said prongs to complete the electric circuit as clearly illustrated in Fig. 7 of the drawings.

A portion of the said connector projects through the top plate and has a suitable guard 22 thereon which protects the receptacle openings in the conventional manner. It will be noted that the steam outlet tube 18 projects through this portion of the connector between the receptacle openings and extends above said portion.

As shown in Fig. 8, I provide, as a part of the present invention, a connector plug comprising a pair of opposed molded halves 23 which are secured together by fasteners 24 and have mounted therebetween a pair of electrical connector prongs 25—25 which extend from the end of said plug and are adapted to be received in the receptacle openings 20—20 and to engage the contacts 21—21. The said connector plug includes a tubular connector 26 which is carried between the halves 23 and has an axial bore adapted to receive the end of the steam outlet tube 18.

In order to conduct the steam from the steam generator to a pressing iron and also to connect the said pressing iron to the source of electric current, I provide a flexible conductor 27 which is preferably made of a material such as rubber or the like. This conductor is of tubular form to provide an axial steam passage 28 and has embedded in the wall and at opposite sides thereof a pair of electrical conductor wires 29—29. One end of the said conductor is connected to the connector plug with the axial tubular portion thereof fitting over the end of the tubular connector 26. The ends of the wires 29—29 extend to the prongs 25—25 and are connected thereto by means of the fastening screws 30—30.

The other end of the conductor 27 extends to the pressing iron, as illustrated in Fig. 9. This pressing iron comprises a sole plate 31 having preferably embedded therein a suitable heating element in the form of a resistance coil 32 which is electrically connected to the wires 29—29, preferably through a suitable thermostat indicated at 33 so as to maintain the pressing iron at a desired predetermined temperature in the manner well known to those skilled in the art.

The said pressing iron has a steam receiving chamber 34 which receives steam from the steam generator through a discharge tube 35 that is connected to the axial tubular portion 28 of the conductor 27 and preferably has a series of perforations 36 through which the steam is discharged into the steam receiving chamber 34. This chamber 34 is preferably filled with a gravel of refractory material which is adapted to become heated, by the heat from the heating element 32, and thereby facilitate the evaporation of any condensate that may form in the conductor tube 27 and enter the chamber 34. The said chamber will also serve to boost the temperature of the steam therein which then passes from said chamber through a passage 37 and through a series of orifices 37-a, in the sole plate 31, onto the material being pressed with said iron.

In order to facilitate the filling of the container 12, I provide a fill tube 38 which extends from the top of the said container through the top plate 8 and has a closure cap 39 thereon which is readily accessible upon said plate.

A pilot light 40 is provided in the electrical circuit for the heating element and mounted upon the top plate, in order to indicate when the heating element is energized, and an electric switch 41 for said circuit is also provided upon the top plate 8 to permit the control of the heating element 13 by the operator.

In order to protect the pilot light, switch, and connector plug from being accidentally contacted by the pressing iron, as it is moved onto the supporting bars 11, there is provided a guard wall 42 as clearly shown in Fig. 1.

The steam generator and the wiring for the electrical circuit may be encased within a cover 43, which is preferably supported by the skirt 9, and an electric conductor cord 44 is connected to said circuit and extends through the wall of the cover 43 for connecting the circuit to a convenient electrical supply outlet.

If desired, a support may be provided, as shown in Figs. 1 and 2, for the steam and electric conductor 27. This support may include a flexible upright rod, or wire 45, which is pivotally secured to a supporting post 46 by means of a wing nut 47 and the upper end of said wire has a suitable hook, or loop 48, which receives the conductor 27. During the movement of the pressing iron over the ironing board, the said support will flex and permit the conductor to follow the iron. When desired, the ironing board with the steam generating device thereon, may be stored away by simply pulling out the connector plug, loosening the wing nut 45, and lowering the rod 45 against the ironing board.

The prongs 25—25 of the connector plug are preferably spaced to also fit the openings of a standard electrical receptacle so that, when desired, the iron can be used independently of the steam generator by simply inserting the said plug directly into the electrical receptacle.

Also, if desired, a suitable spring latch may be used, instead of the wing nut 47, so as to facilitate the positioning of the support 45.

I claim:

1. A steaming and pressing apparatus including an ironing board, a steam generator comprising a top plate secured to said ironing board and on a plane with the top surface thereof, a container depending from the bottom of said top plate, electric heating means for generating steam from liquid in said container, an electric circuit for energizing said heating means, an electric switch for controlling the energizing of the heating means, a heat responsive element adjacent to a wall of said container for operating said switch in response to changes in temperature of the container, an electric connector mounted in said top plate and connected to said circuit, and a steam outlet extending from said liquid container through said connector.

2. A steaming and pressing apparatus comprising a top plate having depending flanges along opposite edges thereof and adapted to be secured to an ironing board extending between said flanges, a liquid container depending from said top plate, an electric heating element for generating steam from liquid in said container, an electric switch for controlling the energization of said heating element, a bi-metallic thermally responsive bar in contact with the bottom of said container and responsive to changes in temperature therein for operating said switch, an electric connector receptacle in said circuit and mounted upon said top plate, the said receptacle including a pair of spaced contact members adapted to receive and contact the prongs of an electric connector plug, and a steam outlet comprising a tube extending from said container into said receptacle between said contact members and adapted to receive a steam conductor.

3. A steaming and pressing apparatus comprising a top plate adapted to be secured to the end portion of an ironing board, a liquid container depending from said top plate, an electric heating element within said container for generating steam from liquid therein, an electric circuit for energizing said heating element, an electric switch in said circuit, means responsive to temperature changes in said container for controlling the energization of said heating means, an electric connector receptacle mounted upon said top plate and having a pair of spaced contact members connected to said circuit, a steam outlet tube projecting from said container and disposed between said contact members and adapted to receive a conductor for steam from said container, a cover encasing said container and switch, an electric supply cord extending through the wall of said cover and connected to said circuit, and a manually operable control switch mounted in said top plate for controlling said circuit.

4. A steaming and pressing apparatus as set forth in claim 3 wherein the container is provided with a fill tube projecting from said container through said top plate.

5. A steaming and pressing apparatus as set forth in claim 3 wherein the electric circuit includes a pilot light mounted in the said top plate.

6. A steaming and pressing apparatus including a steam generator comprising a top plate adapted to be mounted to the end portion of an ironing board, a liquid container depending below said top plate, an electric heating element in said container for generating steam from liquid therein, an electric circuit connected to said heating element for energizing it, an electric connector receptacle mounted upon said top plate and having a pair of spaced contact members connected to said circuit, a steam outlet tube projecting from said container and extending through said receptacle between the said contact members, a connector plug comprising a connecting member adapted to be attached to the said steam outlet tube, a pair of spaced prongs adapted to project into said connector receptacle and engage the said contact members, a flexible conductor comprising a tubular portion connected to said connecting member and having a pair of electric conductor wires in the wall thereof connected to said prongs, and an electric steaming iron having an electric heating element connected to said wires and a steam discharge tube connected to the tubular portion of said conductor, and steam delivery jets in said pressing iron communicating with said discharge tube.

7. A steaming and pressing apparatus including a steam generator comprising a top plate adapted to be mounted to the end portion of an ironing board, a liquid container depending below said top plate, an electric heating element in said container for generating steam from liquid therein, an electric circuit connected to said heating element for energizing it, an electric connector receptacle mounted upon said top plate and having a pair of spaced contact members connected to said circuit, a steam outlet tube projecting from said container and extending through said receptacle between the said contact members, a connector plug comprising a connecting member adapted to be attached to the said steam outlet tube and a pair of spaced prongs adapted to engage the said contact members, a flexible conductor comprising a tubular elongated member having an axial tubular portion connected to the said connecting member and a pair of electric conductor wires embedded in the wall of said conductor at opposite sides thereof and connected to said prongs, an electric steaming and pressing iron having an electric heating element therein connected to said wires, a discharge tube in said pressing iron connected to said tubular portion, a steam receiving chamber in said pressing iron for receiving steam from said discharge tube, and jets in the sole plate of said pressing iron communicating with said steam receiving chamber.

8. A steaming and pressing apparatus as set forth in claim 7 wherein the steam receiving chamber of the pressing iron contains a quantity of gravel for distributing condensate from said tube throughout said chamber to facilitate evaporation thereof.

9. A steaming and pressing apparatus as set forth in claim 7 wherein the spaced prongs of the said connector plug are adapted to fit a standard electrical receptacle to thereby permit use of the electric iron independently of the steam generator.

LUDWIG REICHOLD.

References Cited in the file of this patent

UNITED STATES PATENTS

| Number | Name | Date |
|---|---|---|
| 1,494,156 | De Atley | May 13, 1924 |
| 2,247,438 | Gorton | July 1, 1941 |
| 2,338,739 | Schreyer | Jan. 11, 1944 |